United States Patent
Hara et al.

[19]

[11] Patent Number: 6,139,076
[45] Date of Patent: *Oct. 31, 2000

[54] UNLOCK MECHANISM FOR FOLDABLE REAR SEAT BACK

[75] Inventors: Takeshi Hara, Nissin; Yasuo Oyama, Nagoya, both of Japan

[73] Assignee: Toyota Jidosha Kabushiki Kaisha, Toyota, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,383

[22] PCT Filed: Feb. 26, 1997

[86] PCT No.: PCT/JP97/00556

§ 371 Date: Oct. 27, 1997

§ 102(e) Date: Oct. 27, 1997

[87] PCT Pub. No.: WO97/31799

PCT Pub. Date: Sep. 4, 1997

[30] Foreign Application Priority Data

Feb. 27, 1996 [JP] Japan ..................................... 8-40010

[51] Int. Cl.[7] ...................................................... E05B 3/00
[52] U.S. Cl. .................. 292/336.3; 292/347; 292/DIG. 2
[58] Field of Search ................................. 292/336.3, 347, 292/348, 350, 352, DIG. 37, 346, DIG. 2, 216; 70/432, 438, 441; 296/65.17; 297/378.1, 378.12

[56] References Cited

U.S. PATENT DOCUMENTS

| | | |
|---|---|---|
| 2,512,440 | 6/1950 | Rook ....................................... 292/347 |
| 3,501,187 | 3/1970 | Sakasa . |
| 3,604,230 | 9/1971 | Tixier ........................................ 70/181 |
| 3,999,788 | 12/1976 | Livingston ................................... 292/1 |
| 4,040,652 | 8/1977 | Arfelt ...................................... 292/167 |
| 4,169,620 | 10/1979 | Pacura .................................... 292/347 |
| 4,561,694 | 12/1985 | Mouri et al. . |
| 4,636,005 | 1/1987 | Bolz et al. . |
| 4,637,648 | 1/1987 | Okino et al. . |
| 4,684,175 | 8/1987 | Trutter . |
| 4,779,927 | 10/1988 | Trutter et al. . |
| 4,813,722 | 3/1989 | Viscome et al. . |
| 4,838,588 | 6/1989 | Hayakawa ............................... 292/216 |
| 5,328,243 | 7/1994 | Akiyama . |
| 5,398,995 | 3/1995 | Hurite . |
| 5,700,056 | 12/1997 | Bernard ............................. 297/378.13 |
| 5,762,401 | 6/1998 | Bernard ............................. 297/378.13 |
| 5,855,414 | 1/1999 | Daniel ............................... 297/378.13 |

FOREIGN PATENT DOCUMENTS

| | | |
|---|---|---|
| 6-033729 | 5/1994 | Japan . |
| 6-033730 | 5/1994 | Japan . |
| 7-018964 | 4/1995 | Japan . |

*Primary Examiner*—Neill Wilson
*Assistant Examiner*—Gary Estremsky
*Attorney, Agent, or Firm*—Pillsbury Madison & Sutro LLP

[57] ABSTRACT

An unlock mechanism for a foldable rear seat back which prevents damage to an unlocked state indicator and a front seat. A warning bezel (24) is slidingly fit in a fixed bezel (22) which is fixed to an upper surface (10A) of a rear seat back (10). A first link (32) engages with the warning bezel (24). The first link (32) is connected to a bell crank (38). The bell crank (38) is urged upward by a spring (46). A pin (54), which is provided upright at a latch (16), is movably inserted into a slot (52) which is formed in an open link (50) which is engaged with the bell crank (38). Accordingly, in an unlocked state, when the warning bezel (24) is pressed into the fixed bezel (22), the first link (32) moves downward against urging force of a spring (46), and the warning bezel (24) is accommodated in the fixed bezel (22).

20 Claims, 6 Drawing Sheets

UNLOCK MECHANISM FOR FOLDABLE REAR SEAT BACK

This application is the national phase of international application PCT/JP97/00556, filed Feb. 26, 1997 which designated the U.S.

TECHNICAL FIELD

The present invention relates to an unlock mechanism for a foldable rear seat back, and in particular, to an unlock mechanism for a foldable rear seat which can be folded forward by releasing a locking device by depressing an unlock knob located on the upper surface of the rear seat back.

BACKGROUND TECHNOLOGY

A conventional unlock mechanism for a foldable rear seat back is disclosed in Japanese Utility Model Application Laid-Open (JP-U) No. 7-18964.

As shown in FIG. 6, in this unlock warning mechanism for a foldable rear seat back, a release lever 100 is moved from a lock position to an unlock position and is held at the unlock position even after a lock lever 102 is moved from an engaged position to a disengaged position. A knob 104A of an operating mechanism 104 is movable between a first operating position (the position shown in FIG. 6) for setting the release lever 100 in the lock position and a second operating position (a position lower than the first operating position) for setting the release lever 100 in the unlock position. In a case in which the knob 104A is moved to the second operating position, an indicator 108 disposed at the upper portion of a rear seat back 106 indicates an unlocked state.

However, with this unlock mechanism for a foldable rear seat back, because the indicator 108 projects at the upper portion of the rear seat back 106, in a case in which the rear seat back 106 is folded forward, the indicator 108 interferes with the seat back of the front seat, and the indicator 108 and the seat back of the front seat may be damaged.

With regard to the technology relating to the present invention, as disclosed in Japanese Utility Model Application Laid-Open (JP-U) No. 6-33729 and Japanese Utility Model Application Laid-Open (JP-U) No. 6-33730, a seat back unlock knob is disposed movably along the longitudinal direction of a vehicle, and when the rear seat back is folded forward and the front seat back is reclined rearward, damage to the front seat back by the unlock knob is prevented.

DISCLOSURE OF THE INVENTION

An object of the present invention is to provide an unlock mechanism for a foldable rear seat back in which damage to an unlocked state indicator and a front seat can be prevented.

The present invention is an unlock mechanism for a foldable rear seat back which can be folded forward by an unlock knob disposed at an upper surface of the rear seat back being pressed so as to release a locking device, said unlock mechanism having a warning mechanism comprising: an unlocked state indicator for indicating an unlocked state of the locking device; urging means for urging said unlocked state indicator so as to cause said unlocked state indicator to protrude from the upper surface of the rear seat back in a case in which the locking device is in an unlocked state; and play means for allowing said unlocked state indicator to be pushed into the rear seat back against urging force of said urging means while maintaining the unlocked state of the locking device in a case in which a load is applied to said unlocked state indicator in a direction of pushing in said unlocked state indicator in a state in which said unlocked state indicator is protruded from the upper surface of the rear seat back.

In this way, when the unlock knob is pressed, the locking device is set in an unlocked state and the rear seat back can be folded forward. At the same time, the urging means causes the unlocked state indicator to protrude from the upper surface of the rear seat back. Further, when the rear seat back is folded forward and the unlocked state indicator interferes with the seat back of the front seat and a load in the direction of pushing the unlocked state indicator in is applied thereto, the unlocked state indicator is pushed into the rear seat back by the play means against the urging force of the urging means. Therefore, the unlocked state indicator and the front seat are prevented from being damaged.

Further, in this case, the lock device may be structured so as to include a latch which is engageable with a striker provided at the vehicle body, and a pawl which has a first position at which the pawl engages an engagement groove of the latch in a locked state and a second position at which the pawl slidingly contacts an outer peripheral portion of the latch in an unlocked state, and such that the unlocked state indicator is connected to the pawl via the link mechanism. In this way, in a completely locked state in which the pawl engages the engagement groove of the latch, the unlocked state indicator is pushed into the rear seat back and returns to the non-warning position. Therefore, in a half-locked state, the unlocked state indicator is not pushed into the rear seat back, and the unlocked state including the half-locked state can reliably be indicated.

PREFERRED EMBODIMENTS FOR IMPLEMENTING THE INVENTION

An unlock mechanism for a foldable rear seat back according to an embodiment of the present invention will be described with reference to FIGS. 1 to 3.

Figure 1:
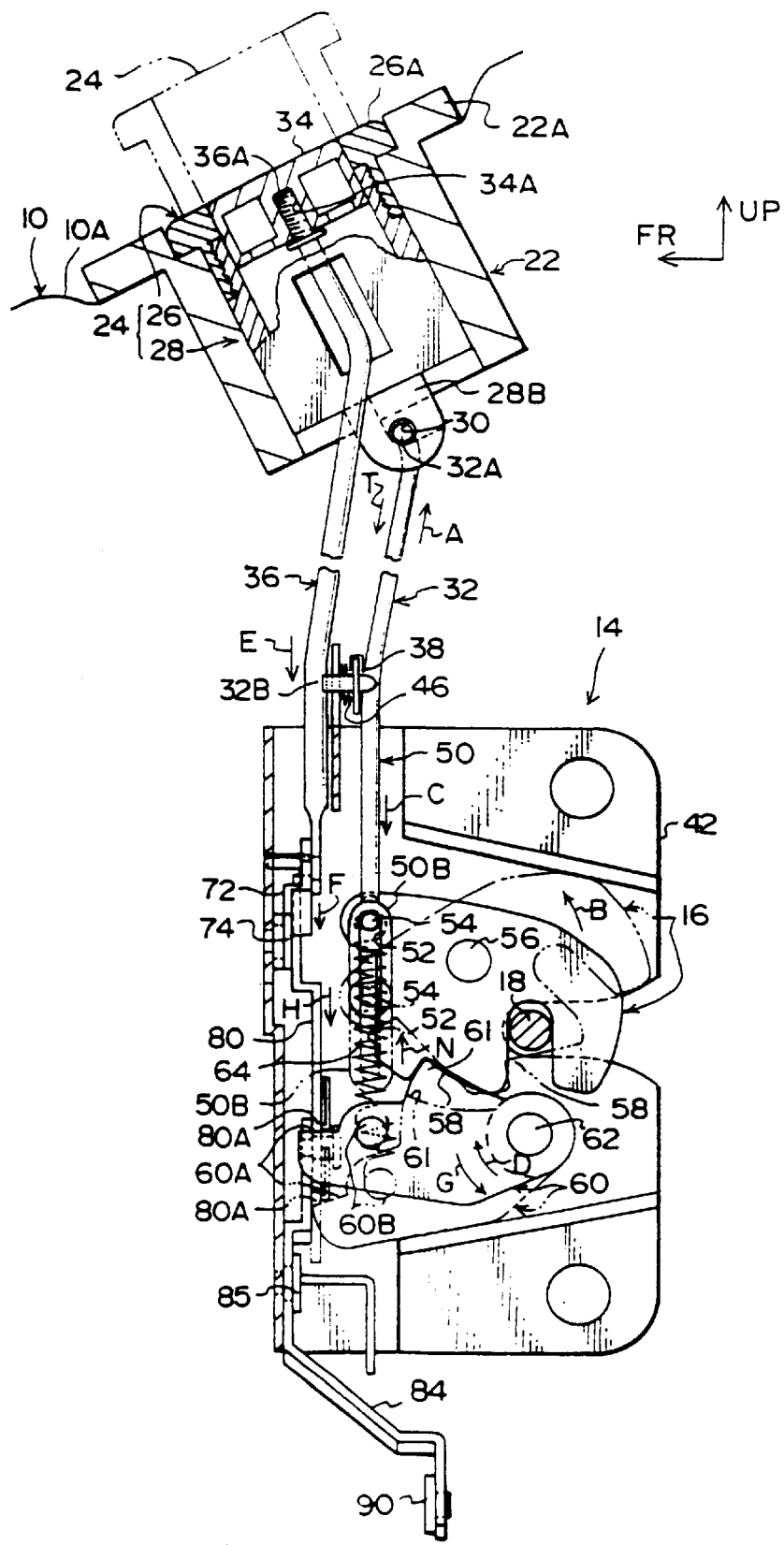
FIG. 1 is a side sectional view of an unlock mechanism for a foldable rear seat back according to an embodiment of the present invention.
Figure 2:
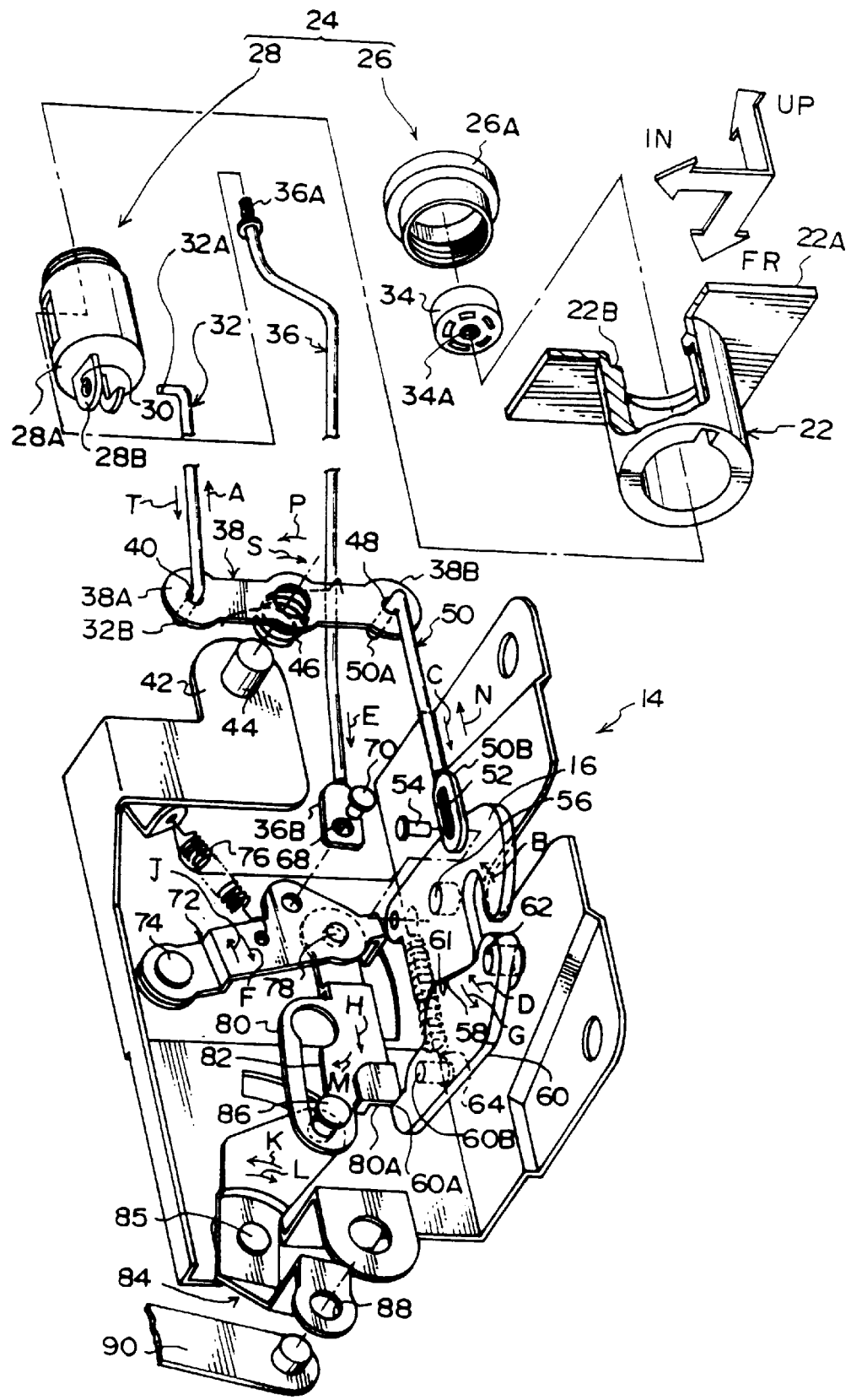
FIG. 2 is an exploded perspective view, as seen from the interior of the vehicle and from the rear of the vehicle, showing an unlock mechanism for a foldable rear seat back according to the embodiment of the present invention.
Figure 3:
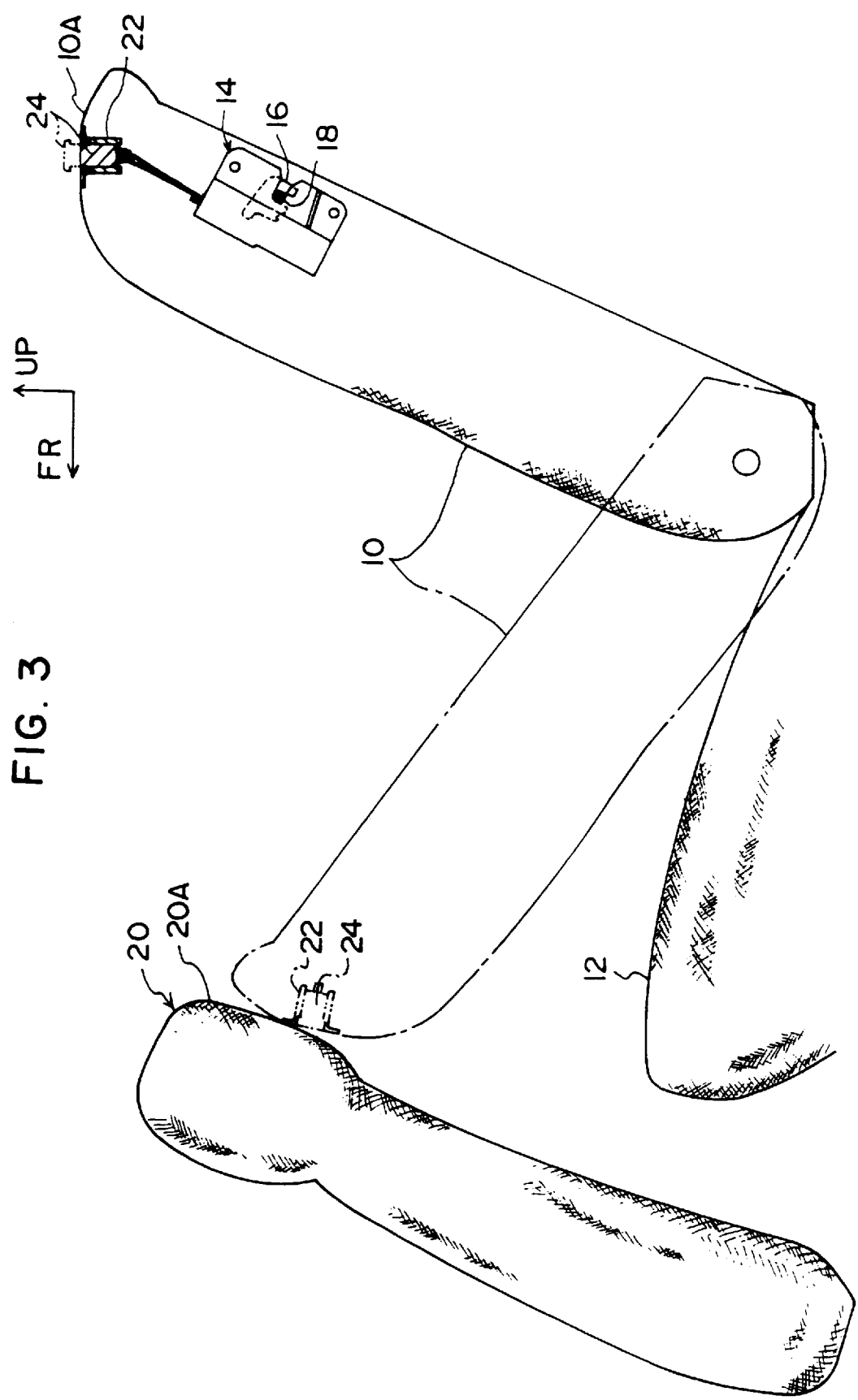
FIG. 3 is a side view schematically showing a rear seat using an unlock mechanism for a foldable rear seat back according to the embodiment of the present invention.

In FIGS. 1 to 3, arrow FR points toward the front of the vehicle, arrow IN points toward the vehicle inner side in the transverse direction thereof, and arrow UP points toward the top of the vehicle.

As shown in FIG. 3, a rear seat back 10 according to the present embodiment is mounted so as to be foldable toward the front of the vehicle by means of a hinge (not shown) provided at a rear portion of a rear seat cushion 12. A locking device 14 is disposed at the upper portion of the rear surface of the rear seat back 10 for holding the rear seat back 10 in normal seating position (i.e., in the state shown by the solid line in FIG. 1). A latch 16 of the locking device 14 engages a striker 18, which is provided at the vehicle body, so as to set a locked state in which the rear seat back 10 is held in the normal seating state. A front seat back 20 is disposed in front of the rear seat cushion 12. A fixed bezel 22 which serves as a fixed cylindrical member is disposed at an upper surface 10A of the rear seat back 10.

As shown in FIG. 2, the fixed bezel 22 is cylindrical, and a flange 22A formed at the upper end thereof contacts the upper surface 10A of the rear seat back 10 (FIG. 1). A cylindrical warning bezel 24 which forms an unlocked state indicator is slidably fitted in the fixed bezel 22. The warning bezel 24 includes a bezel head 26 which is a head portion and a bezel bottom 28 which is a main body portion. The head 26 and the bezel bottom 28 are coupled together by being screwed to each other.

A flange 26A is formed at the upper end of the bezel head 26. The flange 26A is accommodated in an annular recess 22B formed in the opening end of the fixed bezel 22. A mounting portion 28B is protruded from a lower surface 28A of the bezel bottom 28. The mounting portion 28B is formed with a through hole 30. An upper end 32A of a first link 32 engages with the through hole 30.

An unlock knob 34 is coaxially and slidably held in the warning bezel 24. The unlock knob 34 is formed with a threaded hole 34A with which an upper end 36A of a second link 36 is screwed.

A lower end 32B of the first link 32 engages with a through hole 40 formed in an end 38A of a bell crank 38. The bell crank 38 is rotatably supported on a shaft 44 which is provided upright from a base 42 of the locking device 14. A spring 46 serving as an urging means is wound on the shaft 44 and urges the bell crank 38 along the direction of arrow S with a comparatively small urging force. The other end 38B of the bell crank 38 is formed with a through hole 48. The upper end 50A of an open link 50 engages with the through hole 48.

As shown in FIG. 1, a slot 52 serving as a play means is formed in the lower end 50B of the open link 50 along the axial direction of the open link 50. A pin 54 fixed on the latch 16 is movably inserted into the slot 52. The latch 16 is rotatably supported on a base 42 by means of a shaft 56. When the latch 16 is rotated upward (in the direction of arrow B in FIG. 1) about the shaft 56, the open link 50 is moved downward (in the direction of arrow C in FIG. 1).

A recess 58 is formed in the lower portion of the latch 16. A protrusion 61 formed in the upper portion of a pawl 60 engages with the recess 58 when the seat back is locked. The pawl 60 is supported on the base 42 by a shaft 62 so as to be able to rotate upward (in the direction of arrow D in FIG. 1) and downward (in the direction of arrow G in FIG. 1). A protrusion 60B formed on the pawl 60 engages with one end of a spring 64, the other end of which is connected to the pin 54 provided upright at the latch 16. The pawl 60 and the latch 16 are urged to approach each other by the spring 64.

As shown in FIG. 2, a through hole 68 is formed in the lower end 36B of the second link 36. A pin 70 is fitted in the through hole 68 and is fixed on an open lever 72. The open lever 72 is supported rotatably on the base 42 by a shaft 74. When the second link 36 moves downward (in the direction of arrow E in FIG. 2), the open lever 72 is rotated downward (in the direction of arrow F in FIG. 2) about the shaft 74. The open lever 72 is urged upward (in the direction of arrow G in FIG. 2) by a spring 76, one end of which engages with the base 42.

An open link 80 is supported on the open lever 72 through a shaft 78. When the open lever 72 rotates along the direction of arrow F, the open link 80 is moved downward (in the direction of arrow H in FIG. 2). An engaging portion 80A is formed at the lower end of the open link 80. A distal end portion 60A of the pawl 60 engages with the lower surface of the engaging portion 80A. Consequently, when the open link 80 moves in the direction of arrow H, the pawl 60 is rotated downward (in the direction of arrow G in FIG. 2) against the urging force of the spring 64. At the same time, the latch 16 rotates in the direction of arrow B, so that the latch 16 is disengaged from the striker 18 and an unlocked state (indicated by the two-dot chain in FIG. 1) is set.

A vertical slit 82 is formed in the open link 80. A pin 86 provided upright at an end of the locking lever 84 engages with the slit 82. The locking lever 84 is supported by the shaft 85 on the base 42 so as to be rotatable in the directions of arrows K and L in FIG. 2. The other end of the locking lever 84 is formed with a through hole 88, which is coupled with the locking link 90. When the locking lever 84 is rotated in the direction of arrow K by the locking link 90, the opening link 80 is rotated in the direction of arrow M in FIG. 2 about the shaft 78, so that the engagement of the engaging portion 80A of the open link 80 and the distal end portion 60A of the pawl 60 is canceled. In this engagement-released state, the distal end portion 60A of the pawl 60 is not pressed down by the engaging portion 80A of the open link 80 and the locking device is not unlocked even when the unlock knob 34 is pressed.

Next, operation of the present embodiment will be explained.

In accordance with the present embodiment, when the unlock knob 34 is depressed, the second link 36 moves downward (in the direction of arrow E in FIG. 1), and the open lever 72 rotates downward (in the direction of arrow F in FIG. 1) about the shaft 74. The opening link 80 thus moves downward (in the direction of arrow H in FIG. 1). The pawl 60, whose distal end portion 60A is engaged with the lower surface of the engaging portion 80A, is rotated downward (in the direction of arrow G in FIG. 1) about the shaft 62 against the urging force of the spring 64. At the same time, the latch 16 rotates upward (in the direction of arrow B in FIG. 1) about the shaft 56 due to the tension of the spring 64, thereby causing the latch 16 to disengage from the striker 18 and an unlocked state to be set (as indicated by the imaginary line in FIG. 1). The unlocked state is maintained due to the disengagement of the recess 58 of the latch 16 and the protrusion 61 of the pawl 60.

When the latch 16 rotates upward (in the direction of arrow B in FIG. 1) about the shaft 56, the pin 54 which is provided upright at the latch 16 is moved downward and engages the lower end of the slot 52 of the open link 50 so as to move the open link 50 downward (in the direction of arrow C in FIG. 1). When the open link 50 moves downward (in the direction of arrow C in FIG. 1), the bell crank 38 is rotated in the direction of arrow S in FIG. 2 about the shaft 44. As a result, the first link 32 is moved upward (in the direction of arrow A in FIG. 1), and the warning bezel 24 is projected from the upper surface 10A of the rear seat back 10 (to the state shown by the two-dot chain line in FIG. 1).

In a case in which the rear seat back 10 is folded forward with the warning bezel 24 projected from the upper surface 10A of the rear seat back 10 (the state shown by the two-dot chain line in FIG. 3), when the warning bezel 24 abuts a rear surface 20A of the front seat back 20 as shown by the one-dot chain line in FIG. 3, the warning bezel 24 is pressed into the fixed bezel 22 by the rear surface 20A of the front seat back 20. When this pressing force exceeds the urging force of the spring 46, the first link 32 is moved downward (in the direction of arrow T in FIG. 2) and the warning bezel 24 is accommodated in the fixed bezel 22.

Consequently, the warning bezel 24 and the front seat back 20 are prevented from being damaged.

In this case, the movement of the first link 32 downward (in the direction of arrow T in FIG. 2) causes the bell crank 38 to rotate in the direction of arrow P in FIG. 2 about the shaft 44, and the open link 50 moves upward (in the direction of arrow N in FIG. 2). However, because the pin 54 abuts the upper end of the slot 52 and only the open link 50 moves upward (in the direction of arrow N shown in FIG. 2) due to the play between the slot 52 and the pin 54, the latch 16 is not rotated, and the unlocked state is therefore maintained.

In a case in which the rear surface 20A of the front seat back 20 moves away from the warning bezel 24, the urging force of the spring 46 causes the bell crank 38 to rotate in the direction of arrow S in FIG. 2 about the shaft 44. Therefore, open link 50 moves downward (in the direction of arrow C in FIG. 2), while the first link 32 moves upward (in the direction of arrow A in FIG. 2), so that the warning bezel 24 is projected from the upper surface 10A of the rear seat back 10.

In a case in which the rear seat back 10 is rotated toward the rear of the vehicle to be returned to the normal seating state and the latch 16 engages with the striker 18 so that the locked state (the state shown by the solid line in FIG. 1) is set, the rotation of the latch 16 causes the pin 54 to press the upper end of the slot 52, thereby moving the open link 50 upward (in the direction of arrow N in FIG. 1). As a result, the bell crank 38 is rotated in the direction of arrow P in FIG. 2 about the shaft 44, and the first link 32 is moved downward (in the direction of arrow T in FIG. 2). Therefore, the warning bezel 24 is accommodated in the fixed bezel 22. Further, when the locked state (the state indicated by the solid line in FIG. 1) is being set, the pawl 60 is rotated upward (in the direction of arrow D in FIG. 1). Therefore, the open link 80 which is engaged with the distal end portion 60A of the pawl 60 is moved upward so that the open lever 72 rotates upward (in the direction of arrow G in FIG. 2). Consequently, the second link 36 is moved upward so that the unlock knob 34 returns to the locking position (the position indicated by the solid line in FIG. 1).

In accordance with the present first embodiment, disposing the unlock knob 24 in the warning bezel 24 is advantageous in terms of space. Further, since the bezel head 26 and the bezel bottom 28 are screwed to each other, the bezel head 26 and the bezel bottom 28 can be made flush with each other by being screwed together. This compensates for production errors, resulting in an improved external appearance. Moreover, since the play means is formed by the slot 52, accurate operation is ensured with a simple mechanism.

Next, a second embodiment of the unlock mechanism for a foldable rear seat back of the present invention will be described in accordance with FIGS. 4 and 5.

Members which are the same as those of the first embodiment are denoted by the same reference numerals, and description thereof is omitted.

Figure 4:
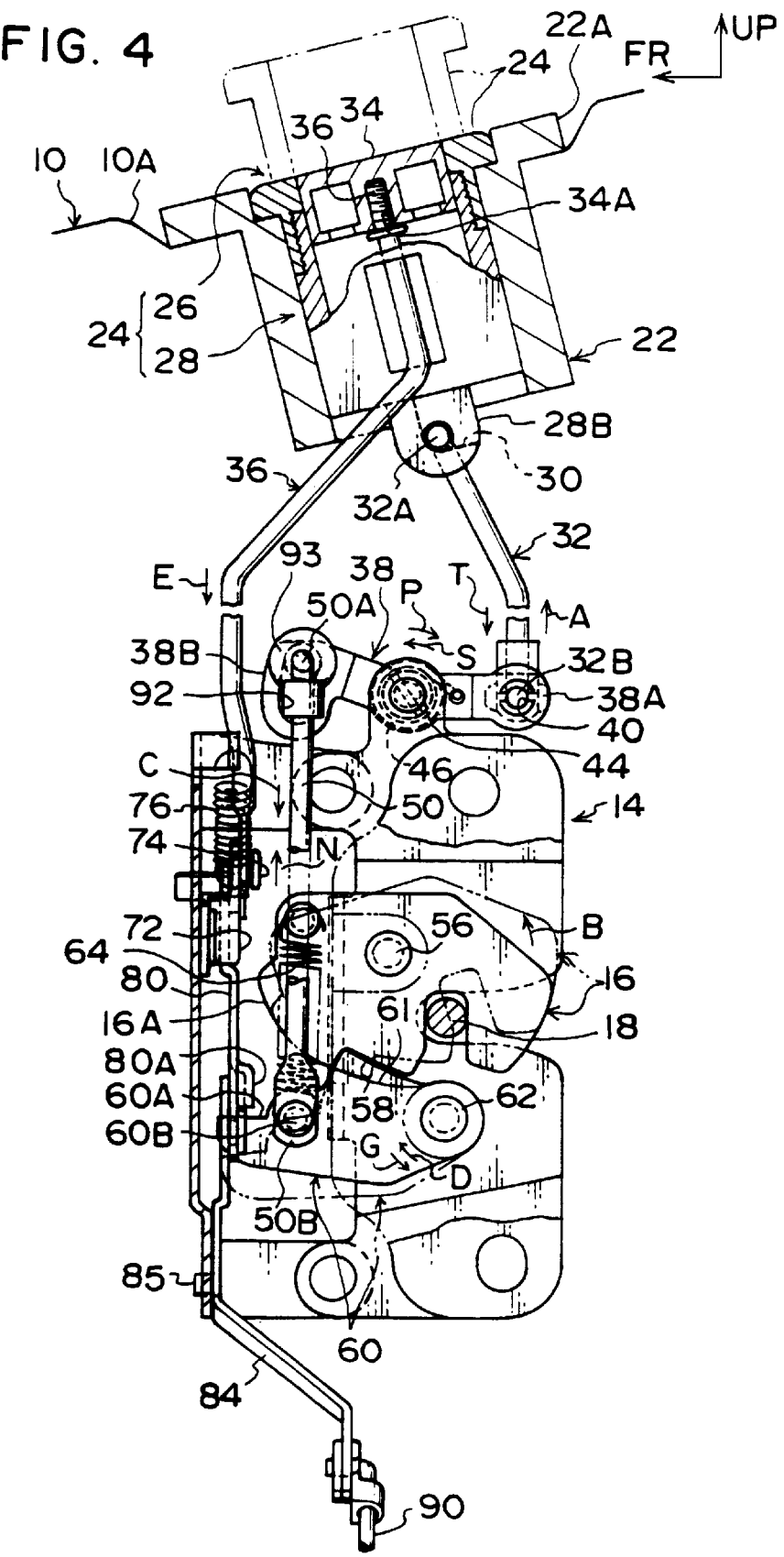
FIG. 4 is a side sectional view illustrating an unlock mechanism for a foldable rear seat back according to a second embodiment of the present invention.
Figure 5:
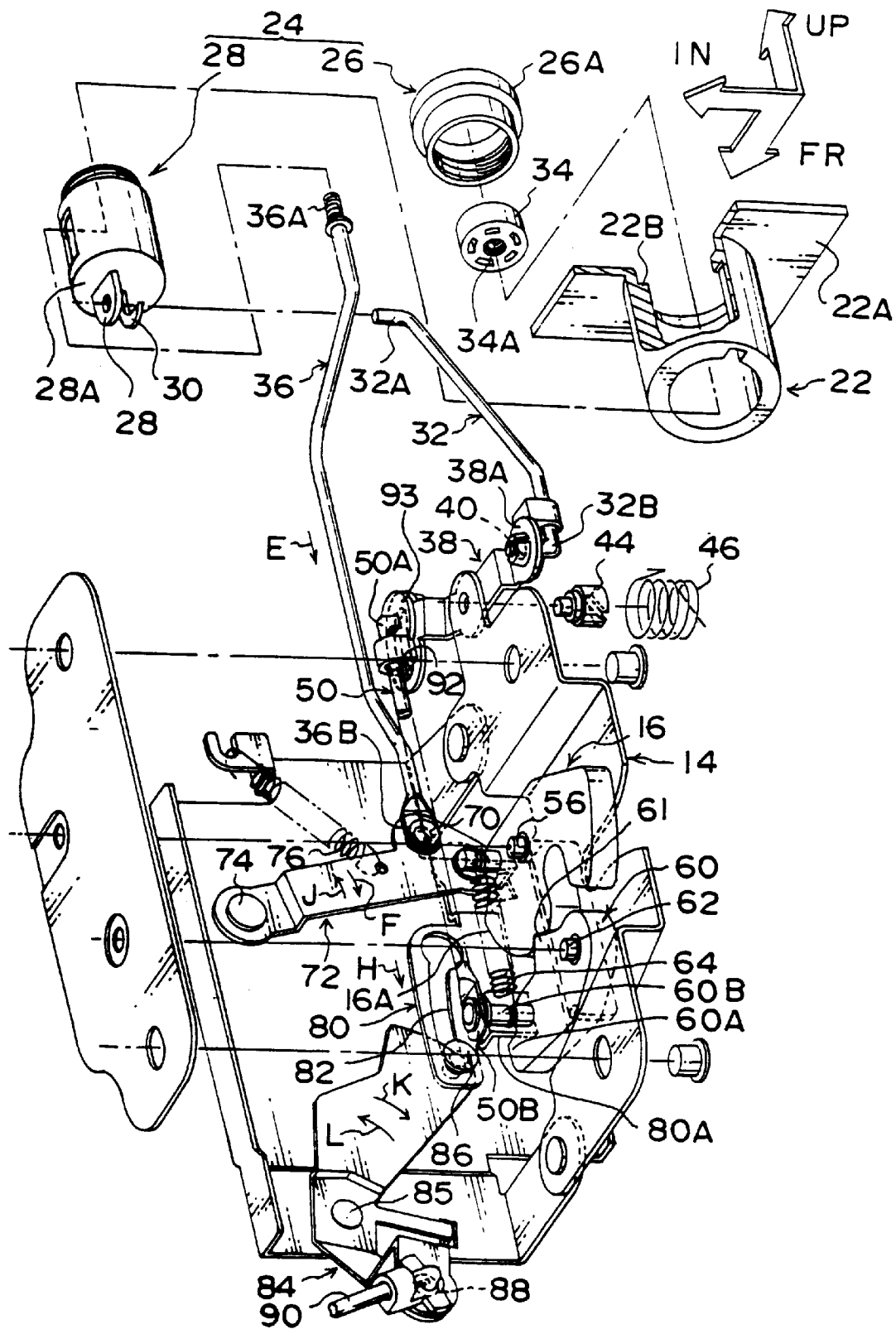
FIG. 5 is an exploded perspective view, as seen from the rear inner side of the vehicle, of the unlock mechanism for a foldable rear seat back according to the second embodiment of the present invention.
Figure 6:
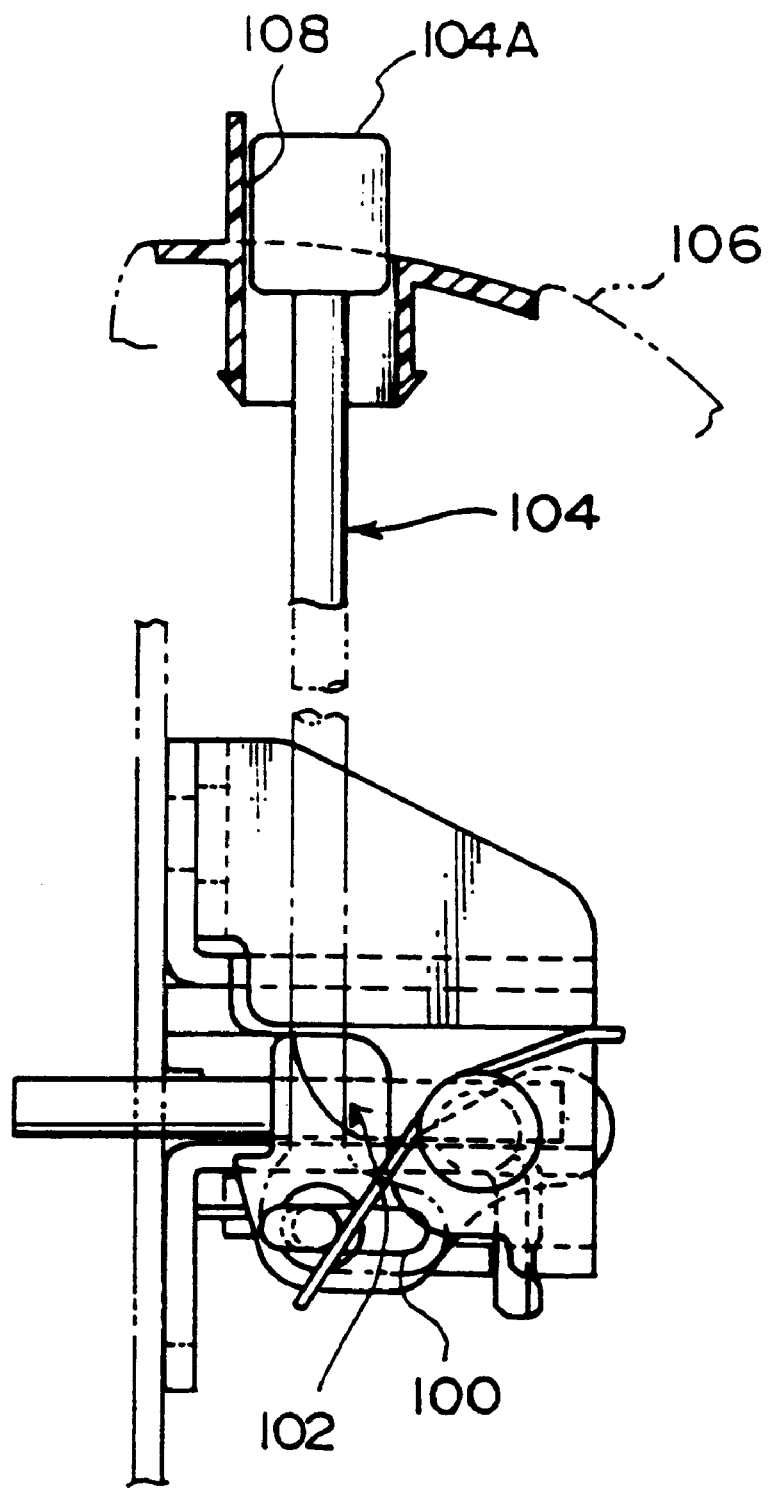
FIG. 6 is a side view of a conventional unlock mechanism for a foldable rear seat back.

As illustrated in FIGS. 4 and 5, in the present second embodiment, a slot 92 serving as a play means is formed in the front end portion 38B of the bell crank 38. The slot 92 is formed in a circular-arc shape, and the upper end 50A of the open link 50 is slidably engaged with the slot 92 via a resin clamp 93. Further, the lower end 50B of the open link 50 is rotatably engaged with the protrusion 60B formed at the pawl 60.

Namely, in the present second embodiment, the open link 50, which is connected to the warning bezel 24 via the first link 32 and the bell crank 38, is joined to the pawl 60. The pawl 60 has two positions: a seat back locking position (a first position at which the protrusion 61 of the pawl 60 engages the recess 58 of the latch 16) and a seat back unlocking position (a second position at which the protrusion 61 of the pawl 60 slidingly contacts an outer peripheral portion 16A of the latch 16).

Next, operation of the present second embodiment will be described.

In the present second embodiment, when the unlock knob 34 is pressed, the second link 36 moves downward (in the direction of arrow E in FIG. 4), and the open lever 72 rotates downward (in the direction of arrow F in FIG. 5) around the shaft 74. In this way, the open link 80 moves downward (in the direction of arrow H in FIG. 5), the pawl 60, whose distal end portion 60A is engaged with the bottom surface of the engaging portion 80A, rotates downward (in the direction of arrow G in FIG. 4) around the shaft 62 against the urging force of the spring 64, the latch 16 rotates upward (in the direction of arrow B in FIG. 4) around the shaft 56 due to the tensile force of the spring 64, the engagement of the latch 16 and the striker 18 is canceled, and due to the protrusion 61 of the pawl 60 slidingly contacting the outer peripheral portion 16A of the latch 16, the unlocked state (the state illustrated by the two-dot chain line in FIG. 4) is maintained.

Namely, in the unlocked state, the open link 50, which is connected to the protrusion 60B of the pawl 60, moves downward (in the direction of arrow C in FIG. 4). When the open link 50 moves downward (in the direction of arrow C in FIG. 4), the bell crank 38 rotates in the direction of arrow S in FIG. 4 around the shaft 44. Therefore, the first link 32 moves upward (in the direction of arrow A in FIG. 4), and the warning bezel 24 projects from the upper surface 10A of the rear seat back 10 (the state illustrated by the two-dot chain line in FIG. 4).

In a state in which the warning bezel 24 projects from the upper surface 10A of the rear seat back 10 (the state illustrated by the two-dot chain line in FIG. 4), in a case in which the rear seat back 10 is inclined forward, when the warning bezel 24 abuts the rear surface 20A of the front seat back 20 (see FIG. 3), the warning bezel 24 is pressed into the fixed bezel 22 by the rear surface 20A of the front seat back 20. In this case, when the pressing force becomes greater than the urging force of the spring 46, the first link 32 moves downward (in the direction of arrow T in FIG. 4), and the warning bezel 24 is accommodated in the fixed bezel 22.

Accordingly, damage to the warning bezel 24 and the front seat back 20 can be prevented.

In this case, when the first link 32 moves downward (in the direction of arrow T in FIG. 4), the bell crank 38 rotates in the direction of arrow P in FIG. 4 around the shaft 44. However, the resin clamp 93, which is provided at the upper end portion 50A of the open link 50, abuts the upper end of the slot 92, and due to the play between the slot 92 and the resin clamp 93, only the bell crank 38 rotates in the direction of arrow P in FIG. 4. Therefore, the pawl 60 and the latch 16 do not rotate. Accordingly, the unlocked state is maintained.

Further, in a case in which the rear surface 20A of the front seat back 20 separates from the warning bezel 24, due to the urging force of the spring 46, the bell crank 38 rotates in the direction of arrow S in FIG. 4 around the shaft 44. Therefore, the first link 32 moves upward (in the direction of arrow A in FIG. 4), and the warning bezel 24 projects from the upper surface 10A of the rear seat back 10.

On the other hand, when the rear seat back 10 is pulled up and the latch 16 and the striker 18 engage so that the locking device is set in the locked state (the state illustrated by the solid lines in FIG. 4), the protrusion 61 of the pawl 60 engages with the recess 58 of the latch 16 so that the locking device is set at the locked position (the state illustrated by the solid lines in FIG. 4). Therefore, the open link 50 moves upward (in the direction of arrow N in FIG. 4). As a result, the bell crank 38 rotates in the direction of arrow P in FIG. 4 around the shaft 44, and the first link 32 moves downward (in the direction of arrow T in FIG. 4). Therefore, the warning bezel 24 is accommodated in the fixed bezel 22. Further, in the locked state (the state illustrated by the solid lines in FIG. 4), the open link 80, which the distal end portion 60A of the pawl 60 engages, moves upward, and the open lever 72 rotates upward (in the direction of arrow J in FIG. 5). Accordingly, the second link 36 moves upward, and the unlock knob 34 returns to the position before unlocking (the position illustrated by the solid lines in FIG. 4).

Further, in the present second embodiment, the open link 50, which is connected to the warning bezel 24, is connected to the pawl 60 which has two positions: the locked state (the first position at which the protrusion 61 of the pawl 60 is engaged with the recess 58 of the latch 16) and the unlocked state (the second position at which the protrusion 61 of the pawl 60 slidingly contacts the outer peripheral portion 16A of the latch 16). Therefore, in the completely locked state in which the protrusion 61 of the pawl 60 engages the recess 58 of the latch 16, the warning bezel 24 is accommodated in the fixed bezel 22. Accordingly, for example, in the half-locked state of the seat (the state in which the protrusion 61 of the pawl 60 slidingly contacts the outer peripheral portion 16A of the latch 16), the warning bezel 24 is not accommodated in the fixed bezel 22. Therefore, the unlocked state, including the half-locked state, can be reliably indicated.

The present invention has been explained above in detail with reference to a specific embodiment. The present invention, however, is not limited to this embodiment. It should be apparent to those skilled in the art that various other embodiments are possible within the scope of the invention.

Possibility of Use in the Industry

As described above, the unlock mechanism for a foldable rear seat back relating to the present invention can be used at a foldable rear seat back in which, by pressing the unlock knob provided on the upper surface of the rear seat back, a lock device is released so that a rear seat back can be collapsed forward. In particular, the unlock mechanism for a foldable rear seat back relating to the present invention is suited to preventing damage of an unlocked state indicator and a front seat.

What is claimed is:

1. An unlock mechanism including an unlocked warning mechanism for a foldable rear seat back which can be folded forward when unlocked, said unlock mechanism comprising:

a locking device;

an unlock knob capable of being assembled to an upper surface of the rear seat back, the unlock knob releasing the locking device and placing the locking device in an unlocked state when activated;

an unlocked state indicator for indicating the unlocked state of the locking device;

urging means for urging said unlocked state indicator to protrude from the upper surface of the rear seat back when the locking device is in the unlocked state;

play means for allowing said unlocked state indicator to be pushed toward the rear seat back against an urging force of said urging means while maintaining the locking device in the unlocked state; and linkage connecting the unlocked state indicator to the locking device, the linkage being movable between first and second positions, wherein when the locking device is placed in the unlocked state, the locking device acts on the linkage, moving it to a position which permits the urging means to urge the unlocked state indicator to protrude, and when the locking device is not in the unlocked state, the linkage is moved to the second position, preventing the urging means from causing the unlocked state indicator to protrude.

2. An unlock mechanism for a foldable rear seat back according to claim 1, wherein the unlock knob is movable between an up position and a retracted position, with the unlock knob being in the retracted position when the locking device is in the unlocked state, and the unlock knob being in the up position when the locking device is not in the unlocked state.

3. An unlock mechanism for a foldable rear seat back according to claim 2, wherein said unlocked state indicator is movable between an up position and a retracted position, the unlocked state indicator being in the up position for indicating the unlocked state of the locking device.

4. An unlock mechanism for a foldable rear seat back according to claim 1, wherein said play means is a portion of the linkage, and the play means allows the unlocked state indicator to retract to an elevation no greater than the upper surface of the rear seat back while maintaining the locking device in the unlocked state.

5. An unlock mechanism for a foldable rear seat back according to claim 4, wherein said play means is a slot provided at a link end portion of said linkage.

6. An unlock mechanism for a foldable rear seat back according to claim 4, wherein the lock device includes a latch which is engageable with a striker provided at a vehicle body, and means for maintaining an unlocked state after being unlocked, wherein said unlocked state indicator is connected to said maintaining means via said linkage.

7. An unlock mechanism for a foldable rear seat back according to claim 4, wherein said play means is a slot provided at a crank end portion for link connection of said linkage.

8. An unlock mechanism for a foldable rear seat back according to claim 4, wherein the locking device has a latch which is engageable with a striker provided at a vehicle body, and means for maintaining an unlocked state after being unlocked, and said unlocked state indicator is connected to said latch via said linkage.

9. An unlock mechanism including an unlocked warning mechanism for a foldable rear seat back which can be folded forward when unlocked, said unlock mechanism comprising:

a locking device;

an unlock knob capable of being assembled to an upper surface of the rear seat back, the unlock knob releasing the locking device and placing the locking device in an unlocked state when activated;

an unlocked state indicator for indicating the unlocked state of the locking device;

urging means for urging said unlocked state to protrude from the upper surface of the rear seat back when the locking device is in the unlocked state;

play means for allowing said unlocked state indicator to be pushed toward the rear seat back against an urging force of said urging means while maintaining the locking device in the unlocked state;

a link mechanism interconnected between said unlocked state indicator and the locking device, wherein said play means is a portion of the link mechanism and wherein the lock device has a latch which is engageable with a striker provided at a vehicle body, and means for maintaining an unlocked state after being unlocked, and wherein said unlocked state indicator is connected to said latch via said link mechanism; and a pin disposed on the latch, wherein said play means is a slot defined in the link mechanism such that the link mechanism is movable with respect to the pin when said unlocked state indicator is pushed toward the rear seat back.

10. An unlock mechanism including an unlocked warning mechanism for a foldable rear seat back which can be folded forward when unlocked, said unlock mechanism comprising:

a locking device;

an unlock knob capable of being assembled to an upper surface of the rear seat back, the unlock knob releasing the locking device and placing the locking device in an unlocked state when activated;

an unlocked state indicator for indicating the unlocked state of the locking device;

urging means for urging said unlocked state indicator to protrude from the upper surface of the rear seat back when the locking device is in the unlocked state;

play means for allowing said unlocked state indicator to be pushed toward the rear seat back against an urging force of said urging means while maintaining the locking device in the unlocked state;

a link mechanism interconnected between said unlocked state indicator and the locking device, wherein said play means is a portion of the link mechanism and wherein the lock device has a latch which is engageable with a striker provided at a vehicle body, and means for maintaining an unlocked state after being unlocked, and wherein said unlocked state indicator is connected to said maintaining means via said link mechanism;

wherein the lock device includes a latch which is engageable with a striker provided at a vehicle body, and means for maintaining an unlocked state after being unlocked, wherein said unlocked state indicator is connected to said maintaining means via said link mechanism; and a crank interconnected to the link mechanism, wherein said play means is a slot defined in the crank such that the crank is movable with respect to said link mechanism when said unlocked state indicator is pushed toward the rear seat back.

11. A foldable rear seat back which can be folded forward when unlocked, the foldable rear seat back having an unlock mechanism including an unlocked warning mechanism, said foldable rear seat back comprising:

a foldable rear seat back;

a locking device disposed on the rear seat back;

an unlock knob disposed in an upper surface of the rear seat back, the unlock knob releasing the locking device and placing the locking device in an unlocked state when activated;

an unlocked state indicator for indicating the unlocked state of the locking device;

urging means for urging said unlocked state indicator to protrude from the upper surface of the rear seat back when the locking device is in the unlocked state;

play means for allowing said unlocked state indicator to be pushed toward the rear seat back against an urging force of said urging means while maintaining the locking device in the unlocked state; and linkage connecting the unlocked state indicator to the locking device, the linkage being movable between first and second positions, wherein when the locking device is placed in the unlocked state, the locking device acts on the linkage, moving it to a position which permits the urging means to urge the unlocked state indicator to protrude, and when the locking device is not in the unlocked state, the linkage is moved to the second position, preventing the urging means from causing the unlocked state indicator to protrude.

12. A foldable rear seat back according to claim 11, wherein the unlock knob is movable between an up position and a retracted position, with the unlock knob being in the retracted position when the locking device is in the unlocked state, and the unlock knob being in the up position when the locking device is not in the unlocked state.

13. A foldable rear seat back according to claim 12, wherein said unlocked state indicator is movable between an extended position and a retracted position, the unlocked state indicator being in the extended position for indicating the unlocked state of the locking device.

14. A foldable rear seat back according to claim 11, a link mechanism interconnected between said unlocked state indicator and the locking device, wherein said play means is a portion of the linkage, and the play means allows the unlocked state indicator to retract completely while maintaining the unlocked state of the locking device.

15. A foldable rear seat back according to claim 14, wherein said play means is a slot provided at a link end portion of said linkage.

16. A foldable rear seat back according to claim 14, wherein the lock device includes a latch which is engageable with a striker provided at a vehicle body, and means for maintaining an unlocked state after being unlocked, wherein said unlocked state indicator is connected to said maintaining means via said linkage.

17. A foldable rear seat back according to claim 14, wherein said play means is a slot provided at a crank end portion for link connection of said linkage.

18. A foldable rear seat back according to claim 14, wherein the lock device has a latch which is engageable with a striker provided at a vehicle body, and means for maintaining an unlocked state after being unlocked, and said unlocked state indicator is connected to said latch via said linkage.

19. A foldable rear seat back which can be folded forward when unlocked, the foldable rear seat back having an unlock mechanism including an unlocked warning mechanism said foldable rear seat back comprising:

a foldable rear seat back;

a locking device disposed on the rear seat back;

an unlock knob disposed in an upper surface of the rear seat back, the unlock knob releasing the locking device and placing the locking device in an unlocked state when activated;

an unlocked state indicator for indicating the unlocked state of the locking device;

urging means for urging said unlocked state indicator to protrude from the upper surface of the rear seat back when the locking device is in the unlocked state;

play means for allowing said unlocked state indicator to be pushed toward the rear seat back against an urging force of said urging means while maintaining the locking device in the unlocked state;

a link mechanism interconnected between said unlocked state indicator and the locking device, wherein said play means is a portion of the link mechanism, and the lock device has a latch which is engageable with a striker provided at a vehicle body, and means for maintaining an unlocked state after being unlocked, and said unlocked state indicator is connected to said latch via said link mechanism, and a pin disposed on the latch, wherein said play means is a slot defined in the link mechanism such that the link mechanism is movable with respect to the pin when said unlocked state indicator is pushed toward the rear seat back.

20. A foldable rear seat back which can be folded forward when unlocked, the foldable rear seat back having an unlock mechanism including an unlocked warning mechanism, said foldable rear seat back comprising:

a foldable rear seat back;

a locking device disposed on the rear seat back;

an unlock knob disposed in an upper surface of the rear seat back, the unlock knob releasing the locking device and placing the locking device in an unlocked state when activated;

an unlocked state indicator for indicating the unlocked state of the locking device;

urging means for urging said unlocked state indicator to protrude from the upper surface of the rear seat back when the locking device is in the unlocked state;

play means for allowing said unlocked state indicator to be pushed toward the rear seat back against an urging force of said urging means while maintaining the locking device in the unlocked state;

a link mechanism interconnected between said unlocked state indicator and the locking device, wherein said play means is a portion of the link mechanism, wherein the lock device includes a latch which is engageable with a striker provided at a vehicle body, and means for maintaining an unlocked state after being unlocked, wherein said unlocked state indicator is connected to said maintaining means via said link mechanism, and a crank interconnected to the link mechanism, wherein said play means is a slot defined in the crank such that the crank is movable with respect to said link mechanism when said unlocked state indicator is pushed toward the rear seat back.

* * * * *